US012179509B1

(12) United States Patent
Currie et al.

(10) Patent No.: US 12,179,509 B1

(45) Date of Patent: Dec. 31, 2024

(54) MAGNETIC WRITING IMPLEMENT

(71) Applicant: Brass Witch, LLC, New York, NY (US)

(72) Inventors: Barbara Jostlein Currie, New York, NY (US); Emma Currie, New York, NY (US)

(73) Assignee: Brass Witch, LLC, New York, NY (US)

( * ) Notice: Subject to any disclaimer, the term of this patent is extended or adjusted under 35 U.S.C. 154(b) by 0 days.

(21) Appl. No.: 18/608,290

(22) Filed: Mar. 18, 2024

(51) Int. Cl.

*B43K 23/00* (2006.01)
*B43K 24/02* (2006.01)
*B43K 29/00* (2006.01)
*B43K 29/02* (2006.01)

(52) U.S. Cl.

CPC .......... *B43K 23/001* (2013.01); *B43K 29/005* (2013.01); *B43K 29/02* (2013.01); *B43K 24/026* (2013.01); *B43K 29/00* (2013.01)

(58) Field of Classification Search

CPC .... B43K 23/001; B43K 29/005; B43K 29/02; B43K 23/00; B43K 23/004; B43K 23/016; B43K 24/00; B43K 24/0026; B43K 29/00

USPC .......................................... 401/195, 117, 258

See application file for complete search history.

(56) References Cited

U.S. PATENT DOCUMENTS

| | | | | |
|---|---|---|---|---|
| 2,559,555 A * | 7/1951 | Zepelovitch | B43K 24/026 | 401/117 |
| 2,941,511 A * | 6/1960 | Cieremans | B43K 7/005 | 401/209 |
| 4,780,016 A * | 10/1988 | Kim | B43K 23/10 | 401/116 |
| 8,641,308 B2 * | 2/2014 | Peyton | B43K 23/12 | 401/116 |
| 2010/0322698 A1 * | 12/2010 | Martin | B43K 7/005 | 401/131 |

* cited by examiner

*Primary Examiner* — David J Walczak

(74) *Attorney, Agent, or Firm* — Husch Blackwell LLP

(57) ABSTRACT

A magnetic writing implement that includes a shaft, a first magnet embedded within the shaft, a stylus nub coupled to a nut that has a first threading and a fourth threading, and a tip that includes a writing medium and extends from the shaft. The magnetic writing implement has a writing configuration that exposes the writing medium when the first threading engages a second threading and a stylus configuration that covers the writing medium when a third threading engages the fourth threading.

22 Claims, 8 Drawing Sheets

MAGNETIC WRITING IMPLEMENT

FIELD

The present invention relates generally to writing implements. More particularly, the present invention relates to a writing implement that converts between a writing implement and a touch screen stylus.

BACKGROUND

Conventional writing implements do not generally satisfy the needs of sophisticated musicians. For example, during a rehearsal, a musician may need to make a note on sheet music noting how to best perform a musical number. Conventionally, musicians left a pencil on a music stand, but a writing implement on a music stand can interfere with a musician's ability to turn the page of sheet music. In addition, composers may give little time for musicians to take notes between practice sessions, which means that sophisticated musicians need immediate and handy access to any writing implement to make the note before playing again.

Moreover, printed matter is being commonly replaced with screens. For example, many musicians have replaced traditional printed sheet music with an electronic version of the music number, and the notes included therein, are displayed on a smartphone, tablet or other display. Conventional writing implements (e.g., pens, pencils, highlighters, markers) cannot interact with a touch screen or the like and cannot allow a musician to make notes on the electronic sheet music.

Moreover, not all sheet music is available or used in electronic form, so many musicians frequently switch between conventional printed sheet music and electronically displayed sheet music. In this situation, a musician must keep both a conventional writing implement and a stylus or other electronic input device, which is not convenient in an orchestra setting with little room for musicians and instruments, especially in the case of musicians who play larger instruments (cellos, tubas, trombones, etc.)

In view of the above, there is a continuing, ongoing need for writing implements.

DETAILED DESCRIPTION

Figure 1:
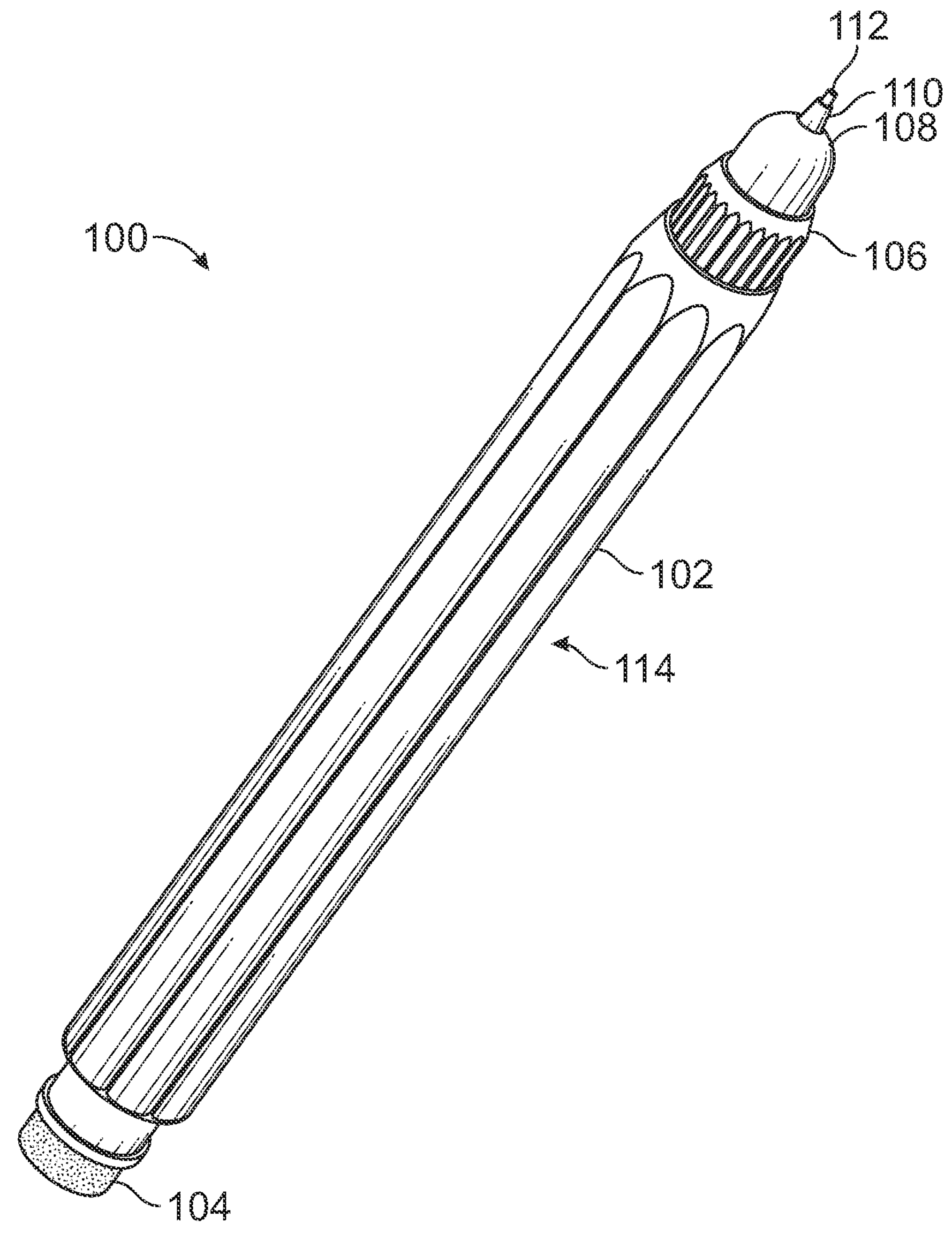
FIG. 1 illustrates a magnetic writing implement in a writing configuration according to an embodiment.

While this invention is susceptible of an embodiment in many different forms, there are shown in the drawings and will be described herein in detail specific embodiments thereof with the understanding that the present disclosure is to be considered as an exemplification of the principles of the invention. It is not intended to limit the invention to the specific illustrated embodiments.

Embodiments disclosed herein can include a magnetic writing implement that can convert between a conventional writing implement, such as a pencil, and a stylus. The magnetic writing implement can include a stylus tip that moves between a writing configuration and a stylus configuration. The magnetic writing implement can include two sets of threading. Engaging the first set of threading moves the magnetic writing implement into the writing configuration, whereby a stylus nub exposes a writing tip (e.g., mechanical pencil lead) so that the writing tip can make markings on paper. Engaging the second set of threading moves the magnetic writing implement into the stylus configuration, whereby the stylus nub covers the writing tip so that the stylus may interact with an electronic touch screen device. While the embodiments disclosed herein describe a mechanical pencil as the writing utensil for making markings on paper, the mechanical pencil may be substituted with a pen, a marker, a highlighter, or any other writing utensil configured to make a marking on paper.

In addition, the magnetic writing implement can include an embedded magnet. In some embodiments, the embedded magnet magnetically can couple to a second magnet, and a magnetic strip includes the second magnet. Alternatively, the embedded magnet can engage with any ferromagnetic metal to magnetically couple to the metal without involving a second magnet. The magnetic strip can include a fastener that can wrap the magnetic strip around a tube or other narrow portion of a musical instrument. Once attached to a musical instrument, the wrapping strip can magnetically engage the magnetic writing implement so that the magnetic writing implement is easily accessible to a musician and quickly and easily stored during a performance. In yet another embodiment, the embedded magnet can couple to a second magnet formed or placed within a musical instrument accessory, such as a shoulder rest of a violin, a strap for an alto saxophone, or any other portion of the musical instrument or associated accessory.

FIG. 1 illustrates a magnetic writing implement 100 according to an exemplary embodiment. As shown, the magnetic writing implement 100 can include a shaft 102 having a writing end and an eraser end. The eraser end of the shaft 102 can include an eraser 104 in the mechanical pencil embodiment. In an embodiment having a pen or marker rather than a mechanical pencil, the eraser 104 may be omitted or replaced with an eraser configured to erase erasable ink.

The writing end of the shaft 102 can include a nut 106, a stylus nub 108, a tip 110, and writing medium 112. In the embodiment shown in FIG. 1, which is a mechanical pencil embodiment, the writing medium 112 can be lead, but in a pen, highlighter, or marker embodiment, the writing medium 112 can be ink or any other writing medium configured to make a marking on paper. In the mechanical pencil embodiment, pressing on the eraser end of the shaft 102 can eject more lead through the tip 110. In a pen embodiment, pressing the eraser end of the shaft 102 can extend or retract a tip of a retractable pen. The internal components of the mechanical pencil or the retractable pen are not illustrated or describe herein and are well-known to a person of ordinary skill in the art. The shaft 102 can house and enclose most or all of the internal components of the mechanical pencil or retractable pen. According to an exemplary embodiment, the internal components can include a tube for storing extra pencil lead or pen ink, springs to control the ejection of lead or the extension of a retractable pen tip, etc.

The shaft 102 can include a magnet 114 positioned therein. In some embodiments, the magnet 114 may not be visible from the outside of the shaft 102. The magnet 114 may couple with a corresponding magnet (e.g., a magnet of opposite magnetic polarity) or to any ferromagnetic metal to hold the magnetic writing implement 100 in a convenient position for a user of the magnetic writing implement 100. In one embodiment, the magnet 114 is formed substantially near the midsection of the shaft 102, but the magnet 114 may be formed anywhere along the shaft 102. In some embodiments, the magnet 114 can couple the magnetic writing implement 100 to any ferromagnetic metal, and a corresponding magnet is not necessary to magnetically couple the magnet 114. In this embodiment, the magnet 114 may be positioned anywhere on a ferromagnetic metal to couple the magnet 114 in place.

Figure 5:
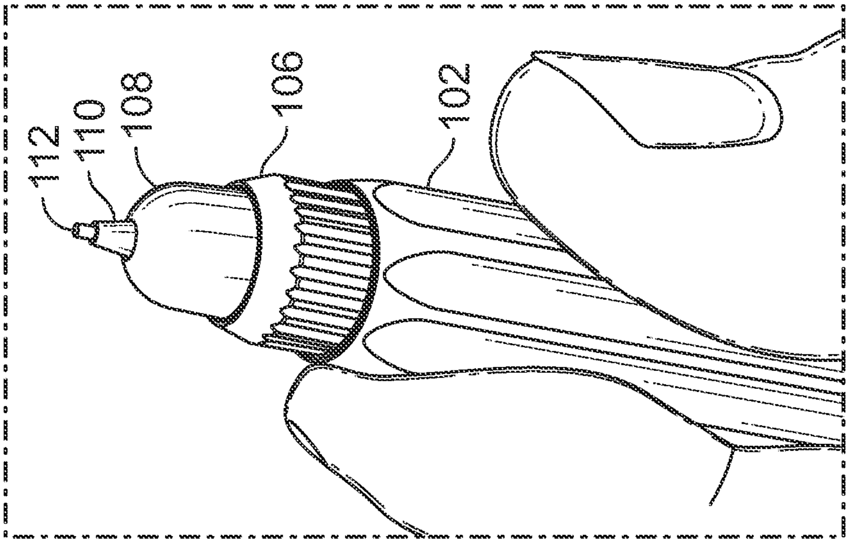
FIG. 5 illustrates the writing end of the magnetic writing implement in the writing configuration according to an embodiment.

The magnetic writing implement 100 can have two configurations: a writing configuration and a stylus configuration. FIGS. 1 and 5 illustrates the magnetic writing implement 100 in the writing configuration because the tip 110 and the writing medium 112 are exposed, allowing the magnetic writing implement 100 to be used as a mechanical pencil for making markings on paper, such as sheet music. The stylus configuration is illustrated in FIGS. 2 and 6.

Figure 2:
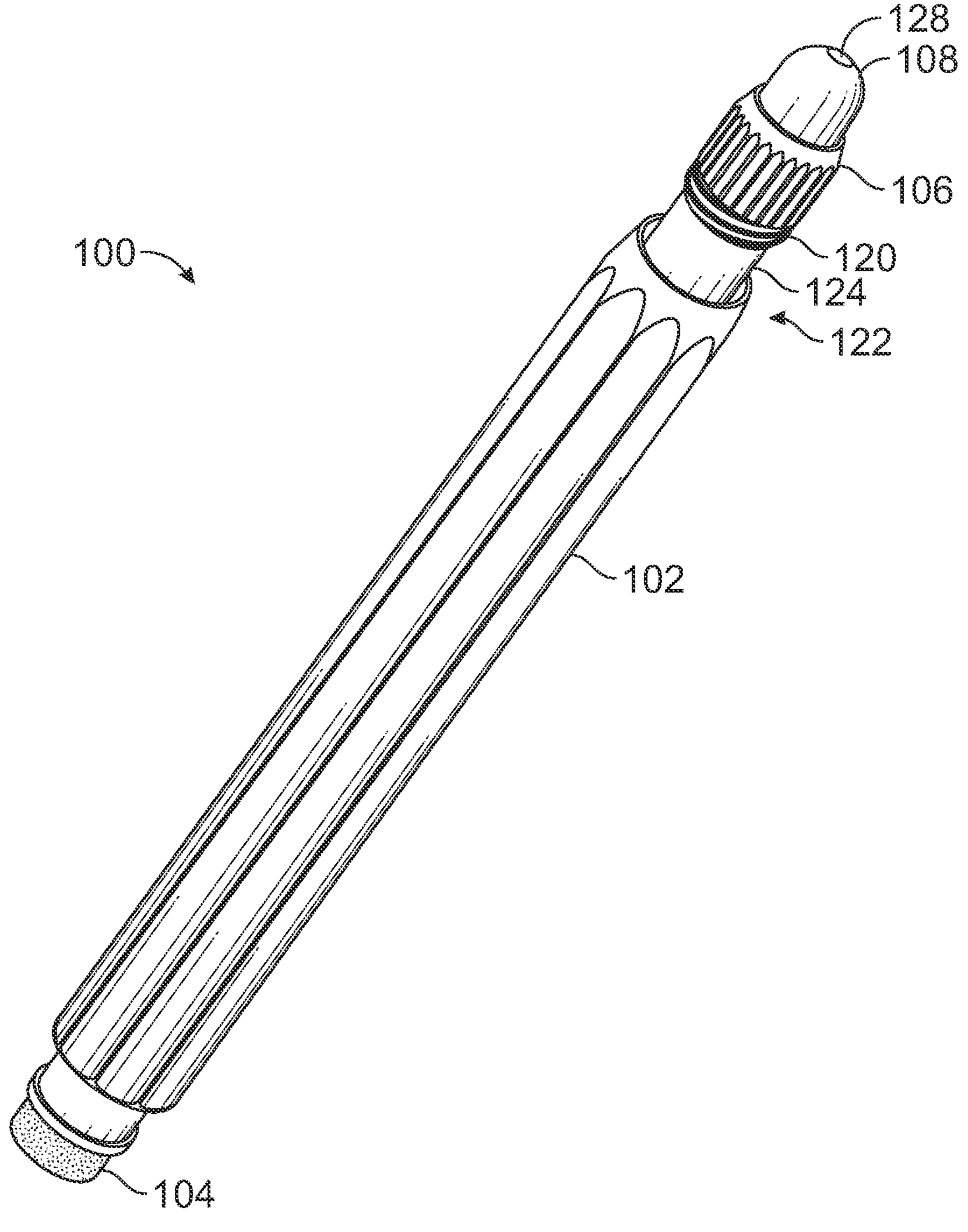
FIG. 2 illustrates the magnetic writing implement in a stylus configuration according to an embodiment.
Figure 6:
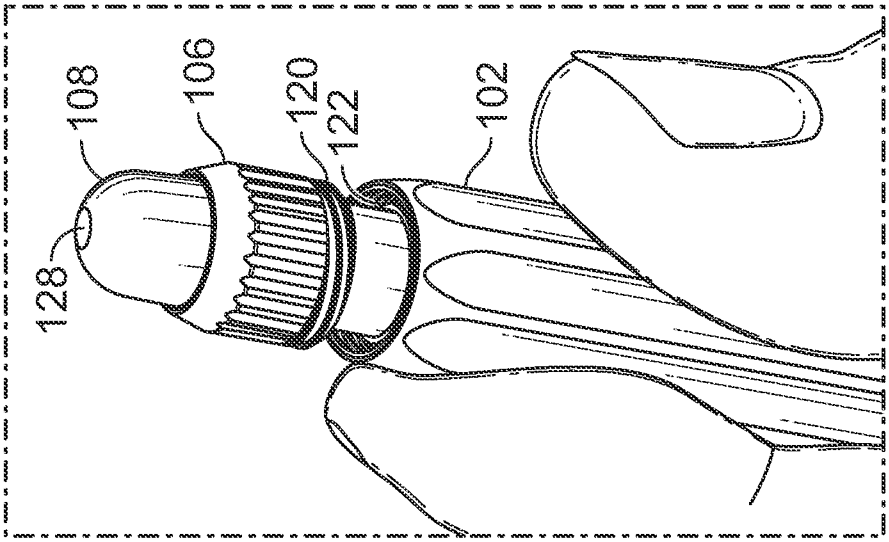
FIG. 6 illustrates the writing end of the magnetic writing implement in the stylus configuration according to an embodiment.

As shown in FIGS. 2 and 6, the nut 106 can include first threading 120 formed on an external surface of the nut 106. In the embodiment shown in FIG. 2, the first threading 120 may be formed at an end of the nut 106 positioned closer to the shaft 102. When the magnetic writing implement 100 is in the writing configuration, the first threading 120 can engage second threading 122 formed inside the shaft 102 at the writing end of the shaft 102. FIG. 2 illustrates that the first threading 120 has disengaged from the second threading 122 allowing the nut 106 to slide along a tip shaft 124 outward and away from the shaft 102 so that the stylus nub 108 covers the tip 110 and the writing medium 112, thereby allowing the magnetic writing implement to act as a capacitive stylus for interfacing a touch screen. In some embodiments, the stylus nub 108 may be used to make notes on digital sheet music displayed on a touch screen display. The stylus nub 108 can couple to the nut 106 via friction fit. Moreover, the nut 106 can taper at the end of the nut 106 further from the shaft 102 to add additional friction on the stylus nub 108. In some embodiments, the stylus nub 108 also engages the tip shaft 124.

Figure 7:
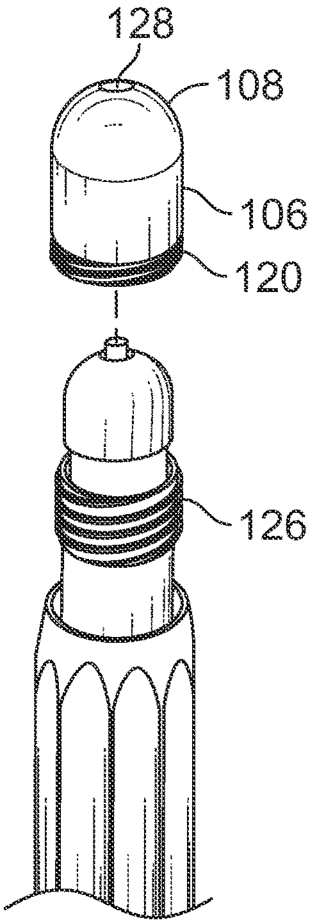
FIG. 7 illustrates a stylus tip of the magnetic writing implement according to an embodiment.

Referring to FIG. 7, the tip shaft 124 can include third threading 126 formed on an external surface of the tip shaft 124 that can engage with fourth threading (not illustrated) formed inside the nut 106. After the first threading 120 has disengaged from the second threading 122 allowing the nut 106 to slide along a tip shaft 124 outward and away from the shaft 102, the fourth threading (not illustrated) formed inside the nut 106 can engage the third threading 126 and lock the nut 106 into place, thereby converting the magnetic writing implement 100 into the stylus configuration. In this way, a user can unscrew the nut 106 from the writing configuration, slide the nut 106 outward, and screw the nut 106 again to cause the magnetic writing implement 100 to have the stylus configuration. Alternatively, to switch from the stylus configuration to the writing configuration, a user can unscrew the nut 106 from the stylus configuration, slide the nut 106 inward towards the shaft 102, and screw the nut 106 again to cause the magnetic writing implement 100 to have the writing configuration. The first and second threading 120, 122 can engage in the writing configuration, and the third threading 126 and fourth threading can engage in the stylus configuration.

The stylus nub 108 may be formed of rubber, silicone, or any other conductive foam to emulate a finger on a touch screen. Such stylus materials are well-known in the art. In addition, as shown best in FIGS. 2, 6, and 7, the stylus nub 108 can include a hole 128 that allows the tip 110 and the writing medium 112 to extend through the hole 128 in the writing configuration. In this way, a user can unscrew and slide the nut 106 to convert the magnetic writing implement 100 from the writing configuration to the stylus configuration or vice versa.

Figure 4:
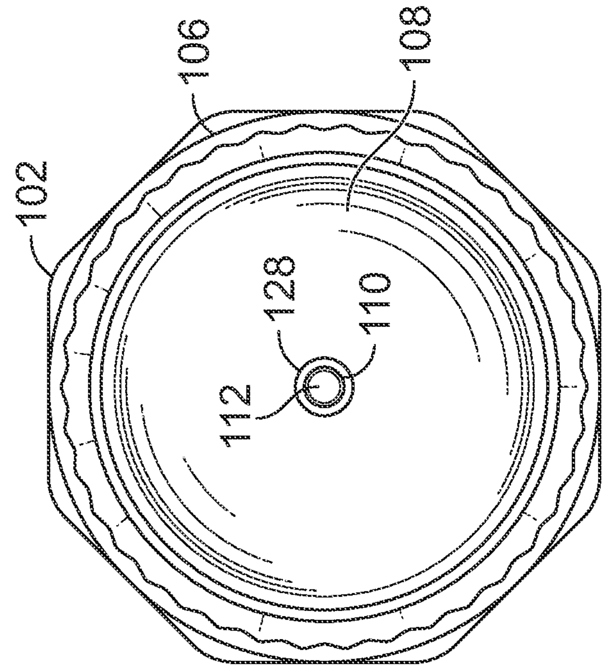
FIG. 4 illustrates a side perspective of the magnetic writing implement from a writing end of the magnetic writing implement according to an exemplary embodiment.
Figure 3:
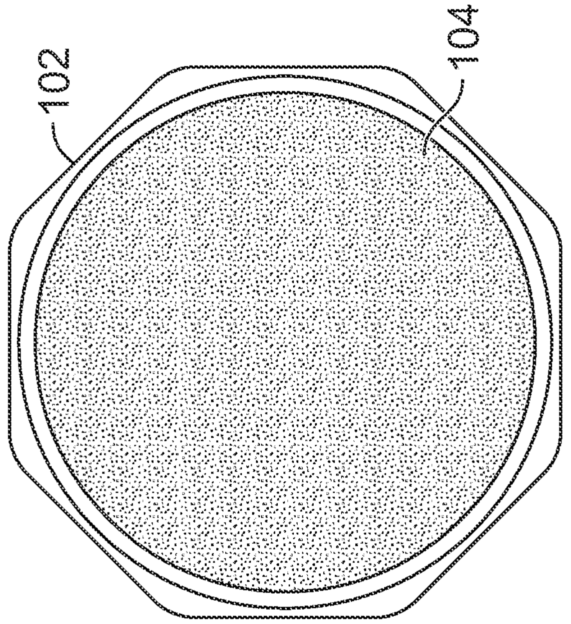
FIG. 3 illustrates a side perspective of the magnetic writing implement from an eraser end of the magnetic writing implement according to an exemplary embodiment.

Referring to FIGS. 3 and 4, the shaft 102 may have an octagonal cross-sectional shape so that a user can easily grip the magnetic writing implement for writing purposes on either paper or a touch screen. The eraser 104 and the stylus nub 108 may have a circular cross-sectional shape. The nut 106 may have a jagged cross-sectional shape to increase friction and make it easier for a user to unscrew and screw the nut 106.

The eraser 104 may be removable and replaceable. In a mechanical pencil embodiment, the eraser 104 may be removable to reveal a pencil lead storage tube, and a user can reload lead into the pencil lead storage tube through a hole on the eraser end of the shaft 102 created by removing the eraser 104. The pencil storage tube may feed lead to the tip 110 to expose the writing medium 112, thereby allowing a user to make markings on paper or another substrate.

Figure 8:
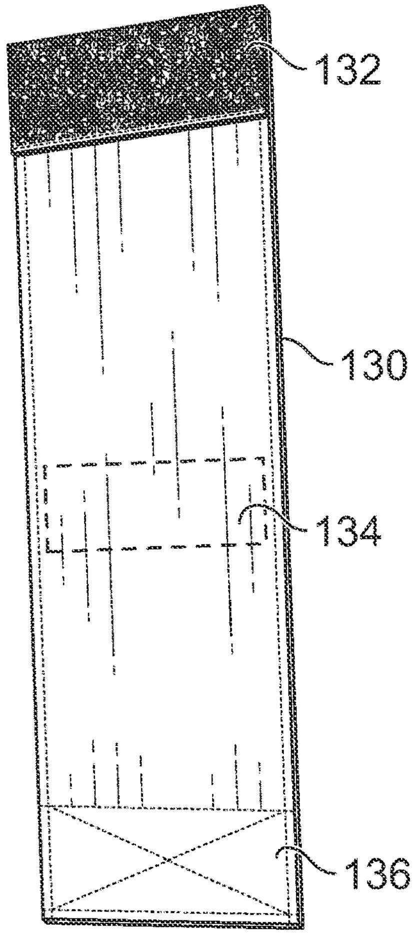
FIG. 8 illustrates a magnetic strip according to an embodiment.
Figure 9:
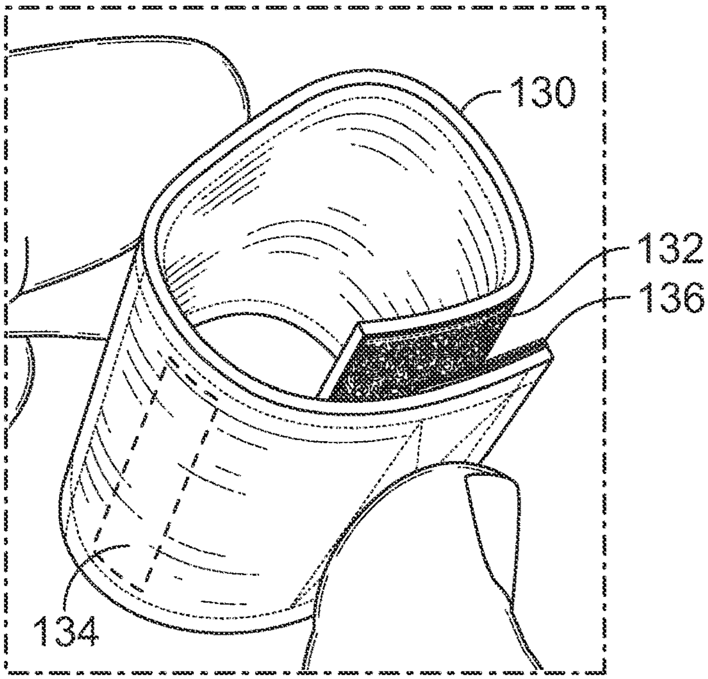
FIG. 9 illustrates the magnetic strip in a wrapped configuration according to an embodiment.

Referring to FIG. 8, the magnetic writing implement 100 may further couple with a magnetic strip 130. The magnetic strip 130 may include a first fastener 132, a magnetic strip magnet 134, and a second fastener 136. The first and second fasteners 132, 136 may comprise, for example, hook-and-look fasteners, and the first and second fasteners 132, 136 may couple to each other to affix the magnetic strip 130 to a certain location, such as to a valve of a musical instrument (see FIG. 12). Other fasteners are envisioned, such as a pair of magnets, adhesive, or any other fastener. As shown in FIG. 9, the first fastener 132 can couple to the second fastener 136 when the first fastener 132 is positioned near and engages the second fastener 136, thereby causing the magnetic strip 130 to wrap.

Figure 10:
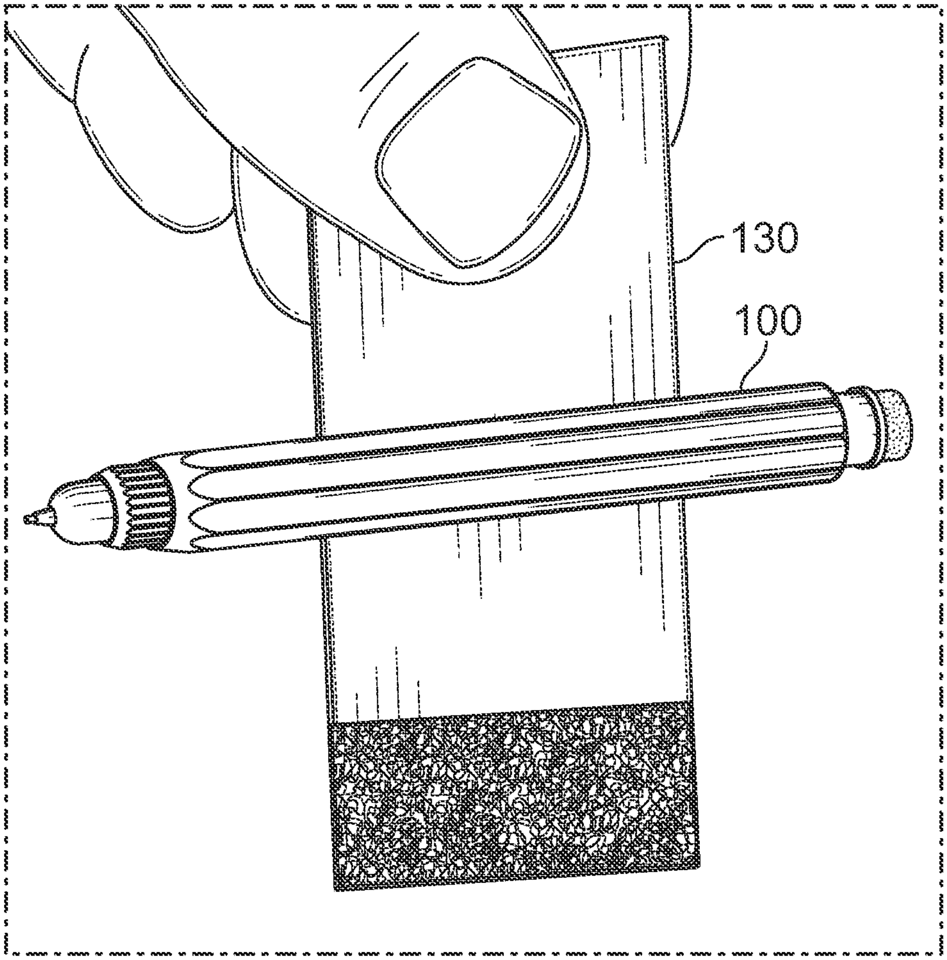
FIG. 10 illustrates the magnetic strip coupling to the magnetic writing implement according to an embodiment.

The magnetic strip magnet 134 may be positioned within the magnetic strip 130. For example, the magnetic strip magnet 134 may be inserted between a pair of fabric strips comprising the magnetic strip 130. In this way, the magnetic strip magnet 134 may be unseen. The magnetic strip magnet 134 can magnetically couple to the magnet 114 within the magnetic writing implement 100. As shown in FIG. 10, due to the magnetic coupling, the magnetic writing implement

Figure 11:
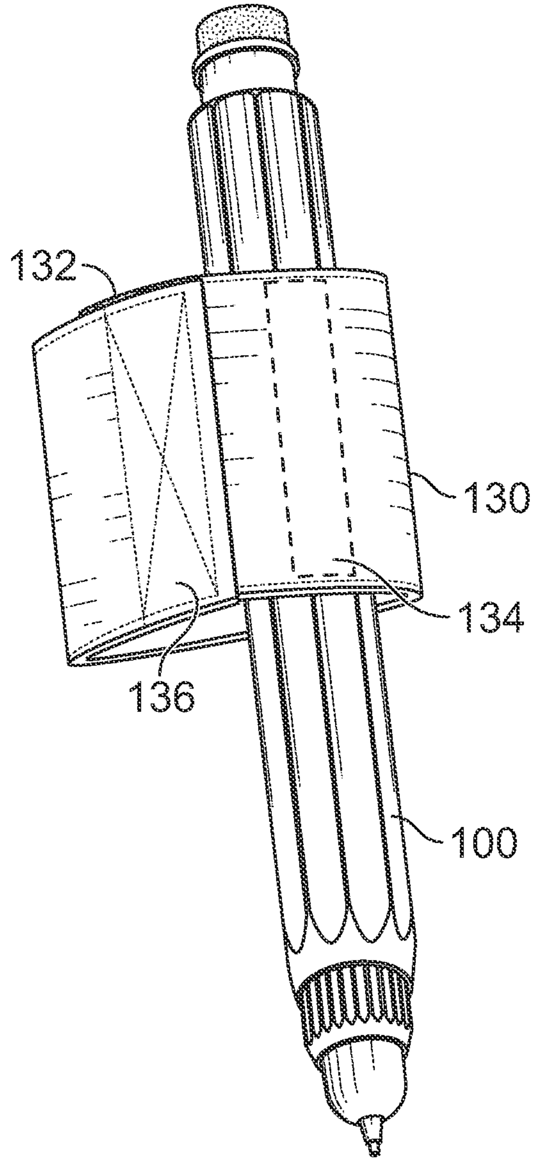
FIG. 11 illustrates the magnetic strip in the wrapped configuration coupling to the magnetic writing implement according to an embodiment.

100 can be held in place against the magnetic strip 130. Even when the first fastener 130 engages the second fastener, thereby forming the magnetic strip 130 into a loop, as shown in FIG. 11, the magnetic writing implement 100 can magnetically couple to the magnetic strip 130.

Figure 12:
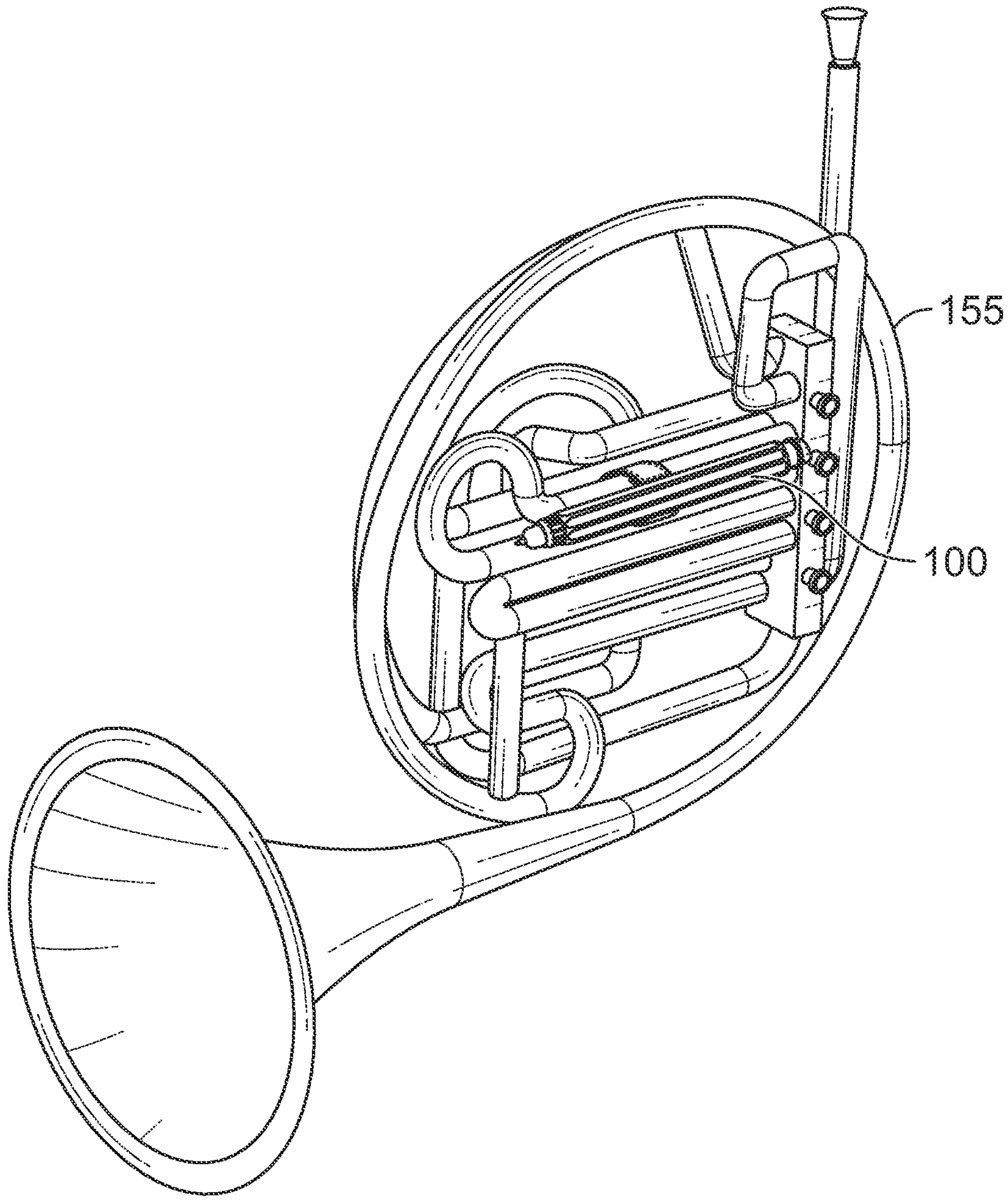
FIG. 12 illustrates the magnetic writing implement coupling to a musical instrument using the magnetic strip according to an embodiment.

The magnetic strip 130 can wrap around any pole, valve, or narrow component, as shown in FIG. 12. In a preferred embodiment, the magnetic strip 130 can wrap around a valve of a musical instrument. FIG. 12 illustrates the magnetic strip 130 wrapping around the valve of a French horn 155. The magnetic strip 130 wraps around a valve or other thin component of the French horn, thereby affixing the magnetic strip 130 to the French horn, and the magnetic strip 130 can magnetically couple to the magnetic writing implement 100.

As a result, the system described herein conveniently stores a writing implement during a musical rehearsal, and a musician can easily grab the magnetic writing implement during rehearsal to make notes on sheet music. After use, the musician need only slide the magnetic writing implement 100 near the magnetic strip 130 to store the magnetic writing implement 100. Moreover, because the magnetic writing implement 100 easily converts between a writing configuration and a stylus configuration, the magnetic writing implement 100 can easily take notes on either paper sheet music or electronic sheet music displayed on a touch screen.

Although a few embodiments have been described in detail above, other modifications are possible. For example, the steps described above do not require the particular order described or sequential order to achieve desirable results. Other steps may be provided, steps may be eliminated from the described flows, and other components may be added to or removed from the described systems. Other embodiments may be within the scope of the invention.

From the foregoing, it will be observed that numerous variations and modifications may be effected without departing from the spirit and scope of the invention. It is to be understood that no limitation with respect to the specific system or method described herein is intended or should be inferred. It is, of course, intended to cover all such modifications as fall within the spirit and scope of the invention.

What is claimed is:

1. A magnetic writing implement comprising:
- a shaft having a first end and a second end;
- a first magnet embedded within the shaft;
- a stylus nub coupled to a nut, wherein the nut comprises a first threading formed at a first position on the nut and a fourth threading formed at a second position on the nut; and
- a tip extending from the shaft at the first end of the shaft, the tip including a writing medium;
- wherein the magnetic writing implement is configured to have a writing configuration that exposes the writing medium when the first threading engages a second threading, and
- wherein the magnetic writing implement is further configured to have a stylus configuration that covers the writing medium when a third threading engages the fourth threading.

2. The magnetic writing implement of claim 1, wherein the magnetic writing implement is further configured to convert from the writing configuration to the stylus configuration by disengaging the first threading and the second threading, sliding the nut and stylus nub away from the shaft along a tip shaft, and engaging the third threading to the fourth threading.

3. The magnetic writing implement of claim 2, wherein the third threading is formed on the tip shaft at an end of the tip shaft near the tip.

4. The magnetic writing implement of claim 2, wherein the magnetic writing implement is further configured to convert from the stylus configuration to the writing configuration by disengaging the third threading and the fourth threading, sliding the nut and stylus nub toward the shaft along the tip shaft, and engaging the first threading to the second threading.

5. The magnetic writing implement of claim 1, wherein the first threading is formed on an external surface of the nut at a first end of the nut positioned closer to the shaft.

6. The magnetic writing implement of claim 1, wherein the second threading is formed inside the shaft at the first end of the shaft.

7. The magnetic writing implement of claim 1, wherein the fourth threading is formed on an internal surface of the nut.

8. The magnetic writing implement of claim 1 further comprising:
- an eraser positioned at the second end of the shaft; and
- mechanical pencil components configured to eject the writing medium through the tip.

9. The magnetic writing implement of claim 1, wherein the stylus nub includes a hole, and wherein the tip and writing medium extend through the hole in the writing configuration.

10. The magnetic writing implement of claim 1, wherein the stylus nub may comprises rubber, silicone, or conductive foam to cause the stylus nub to act as a capacitive stylus for a touch screen.

11. The magnetic writing implement of claim 1, wherein the first magnet magnetically couples to a second magnet included within a strip, the strip configured to wrap around a component of a musical instrument.

12. An apparatus comprising:
- a magnetic writing implement comprising:
  - a shaft having a first end and a second end;
  - a first magnet embedded within the shaft;
  - a stylus nub coupled to a nut, wherein the nut comprises a first threading formed at a first position on the nut and a fourth threading formed at a second position on the nut; and
  - a tip extending from the shaft at the first end of the shaft, the tip including a writing medium;
  - wherein the magnetic writing implement is configured to have a writing configuration that exposes the writing medium when the first threading engages a second threading, and
  - wherein the magnetic writing implement is further configured to have a stylus configuration that covers the writing medium when a third threading engages the fourth threading; and
- a magnetic strip comprising:
  - a second magnet;
  - a first fastener; and
  - a second fastener, wherein the first fastener is configured to couple to the second fastener, and
  - wherein the second magnet is configured to magnetically couple with the first magnet.

13. The apparatus of claim 12, wherein the magnetic writing implement is further configured to convert from the writing configuration to the stylus configuration by disengaging the first threading and the second threading, sliding the nut and stylus nub away from the shaft along a tip shaft, and engaging the third threading to the fourth threading.

14. The apparatus of claim 13, wherein the magnetic writing implement is further configured to convert from the stylus configuration to the writing configuration by disengaging the third threading and the fourth threading, sliding the nut and stylus nub toward the shaft along the tip shaft, and engaging the first threading to the second threading.

15. The apparatus of claim 12, wherein the first threading is formed on an external surface of the nut at a first end of the nut positioned closer to the shaft.

16. The apparatus of claim 12, wherein the second threading is formed inside the shaft at the first end of the shaft.

17. The apparatus of claim 12, wherein the fourth threading is formed on an internal surface of the nut.

18. The apparatus of claim 12, wherein the third threading is formed on the tip shaft at an end of the tip shaft near the tip.

19. The apparatus of claim 12, wherein the stylus nub includes a hole, and wherein the tip and writing medium extend through the hole in the writing configuration.

20. The apparatus of claim 12, wherein the stylus nub may comprises rubber, silicone, or conductive foam to cause the stylus nub to act as a capacitive stylus for a touch screen.

21. The apparatus of claim 12, wherein the strip is configured to wrap around a component of a musical instrument.

22. A magnetic writing implement comprising:

a shaft having a first end and a second end;

a first magnet embedded within the shaft;

a stylus nub coupled to a nut, wherein the nut comprises a first threading formed at a first position on the nut and a fourth threading formed at a second position on the nut; and a tip extending from the shaft at the first end of the shaft, the tip including a writing medium;

wherein the magnetic writing implement is configured to have a writing configuration that exposes the writing medium when the first threading engages a second threading, wherein the magnetic writing implement is further configured to have a stylus configuration that covers the writing medium when a third threading engages the fourth threading, and wherein the stylus nub includes a hole, and wherein the tip and writing medium extend through the hole in the writing configuration.

* * * * *